United States Patent [19]

Halberschmidt et al.

[11] Patent Number: 4,575,389

[45] Date of Patent: Mar. 11, 1986

[54] DEVICE FOR BENDING GLASS PLATES

[75] Inventors: Friedrich Halberschmidt, Herzogenrath; Josef Audi, Aachen; Gerhard Schubert, Herzogenrath, all of Fed. Rep. of Germany

[73] Assignee: Saint-Gobain Vitrage, Courbevoie, France

[21] Appl. No.: 669,795

[22] Filed: Nov. 9, 1984

[30] Foreign Application Priority Data

Nov. 9, 1983 [FR] France ................. 83 17830

[51] Int. Cl.$^4$ .......................................... C03B 23/033
[52] U.S. Cl. ........................................ 65/273; 65/104; 65/107; 65/245; 65/253; 65/287
[58] Field of Search ............ 65/104, 106, 107, 273, 65/245, 253, 268

[56] References Cited

U.S. PATENT DOCUMENTS

| | | | |
|---|---|---|---|
| 3,223,498 | 12/1965 | Davidson, Jr. | 65/104 X |
| 4,054,438 | 10/1977 | Presta | 65/104 X |
| 4,139,359 | 2/1979 | Johnson | 65/104 X |

*Primary Examiner*—Arthur Kellogg
*Attorney, Agent, or Firm*—Oblon, Fisher, Spivak, McClelland & Maier

[57] ABSTRACT

The invention relates to bending of glass plates moving in a horizontal position, under the effect of their own weight, with a device comprising a shaping bed made of rotating shaping elements whose surfaces in contact with the glass plates, as they advance, define increasingly curved generatrices, these shaping elements being carried by a frame that can be inclined by pivoting around a transverse axis located at its upstream end. The frame is mounted on pivoting axes (XX', YY', ZZ') that are adjustable in height. Particular zones of the glass plates can be kept at a constant level during bending, which improves the optical quality of the glass plates thus bent.

16 Claims, 6 Drawing Figures

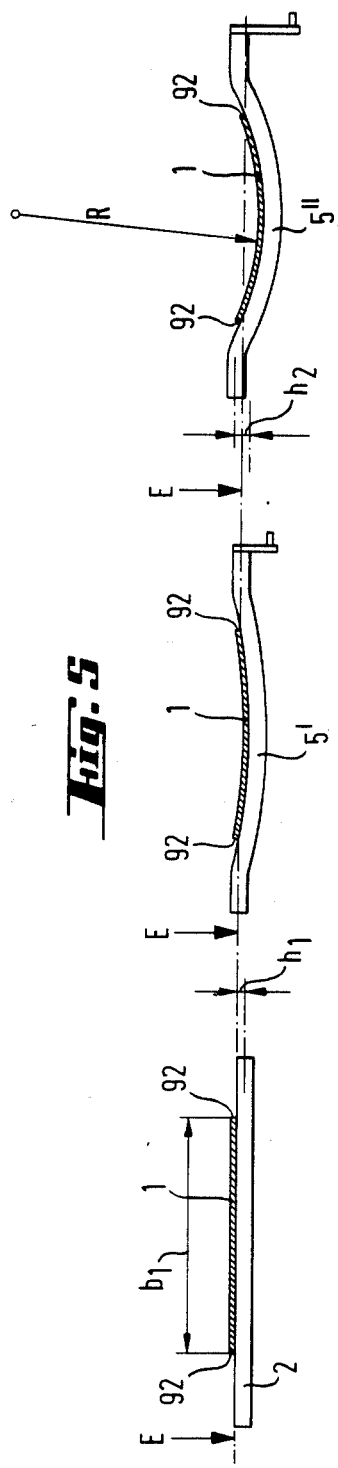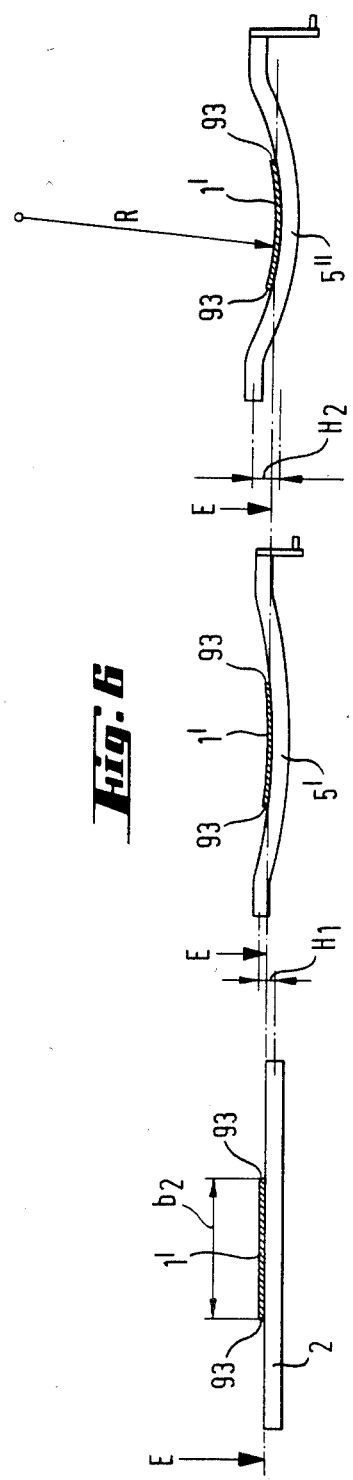

DEVICE FOR BENDING GLASS PLATES

BACKGROUND OF THE INVENTION

1. Field of the Invention

This invention relates to bending of glass plates moving in a horizontal or approximately horizontal position, under the effect of their own weight, with a device including a shaping bed made of rotating shaping elements whose surfaces in contact with the glass plates, as they advance, define increasingly curved generatrices, these shaping elements being mounted on a frame that is adjustable in height and can be inclined in the lengthwise direction of movement of the plates, by pivoting around a transverse horizontal axis located at the upstream end of the shaping bed. The rotating shaping elements of the shaping bed can have various configurations. The disclosure of this application is related to the U.S. patent application Ser. No. 669,872, filed on the same date as the present application by the present Applicants and entitled "BENDING OF GLASS SHEETS ON SHAPING BED CONSISTING OF ROTATING ELEMENTS".

2. Description of the Prior Art

It is known to have rigid rollers with a curved profile, mounted to rotate, as shown in U.S. Pat. No. 4,139,359.

It is also known to have rotating rods or cylindrical rollers that are sufficiently flexible and elastic to be deformed by the inclination of their ends in relation to the horizontal and so that this modification of shape is compatible and is maintained with the rotation. Such deformable rollers are described, for example, in U.S. Pat. No. 4,226,608.

In another known bending device, the rotating shaping elements also participate in the conveying and are formed by flexible tubular sheaths rotatably driven around rigid curved rods. Adjustment of the radius of curvature of the bending shape, and the progression of its curvature in the direction of conveying the glass plates is achieved by the fact that the various curved rods are mounted so as to be able to be pivoted around an axis that passes through their ends, and so they can be adjusted to inclinations that are different from one another, which increasingly removes them from the conveying plane in which the glass plates are located when they arrive.

Such a bending device is described in detail in French Pat. No. 2,312,463. In this prior device, the shaping elements, i.e., curved rods surrounded by their rotating tubular sheaths, are mounted on a frame hinged at its upstream end on a stationary pivoting axis located at the level of the cylindrical conveying rollers of the preceding installation that brings the glass plates to the device. While each curved rod can be more or less inclined to cause a variation of the radius of curvature which each element that it contains exhibits to the underside of the glass plates, the frame that supports the assembly of shaping elements is able to pivot around the transverse axis located at its upstream end so that the summits of the curvatures of the shaping elements always remain at the level at which the flat plane glass plates are introduced in the bending device.

It is thus possible for both convex and concave shaping beds to maintain the central line at the summit of the sheets of glass at the same level during the bending operation.

However, when to meet certain conditions, it is desired to perform the bending so that the lengthwise edges of the glass sheets extending parallel to the conveying direction remain at the same level, this is possible with the known device for only a determined width of glass plates. When glass plates of another width have to be bent, the position of their lengthwise edges on the shaping elements is necessarily different and the level of these edges is necessarily lower or higher, which acts on the optical quality of the curved glass plates and can affect them unfavorably.

SUMMARY OF THE INVENTION

The present invention has as its object the provision of bending devices of the type specified, which make it possible to meet the most varied requirements relative to the level of determined zones of the treated glass plates.

In particular, the bending device should be of such flexibility that, both in the case of convex and concave shaping beds, independently of the size of the glass plates to be bent, it offers the possibility of maintaining either the central line at the summit of the curvature or the lengthwise edges of the glass plates at the initial conveying level of the plane glass plates, during the bending and optionally the tempering and/or cooling that follow.

This object is achieved according to the invention by the fact that the pivoting shaft of the frame carrying the shaping elements is mounted to be adjustable in height.

Thanks to this adjustment in height of the pivoting axis of the frame carrying the shaping elements, adapting of the bending device to a particular requirement has already been performed the moment the first shaping element is encountered by the glass plates so that there are avoided slight unfavorable influences of the prior devices in which optionally only the shaping elements placed downstream could be adjusted in height.

Thus during bending of glass plates of different widths, adjustment of the bending devices according to the invention can be modified so that, particularly in the case of a concave shaping bed, the lengthwise edges of the glass plates, parallel to the conveying direction, remain constantly exactly at the same level, as well as in the heating furnace which precedes the bending device, in the bending device itself, and in the tempering and/or cooling installations that follow.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 5 and 6 are diagrams illustrating the operation of adjusting the height of the pivoting axis of the frame carrying the shaping bed.

DETAILED DESCRIPTION OF THE PREFERRED EMBODIMENTS

Figure 1:
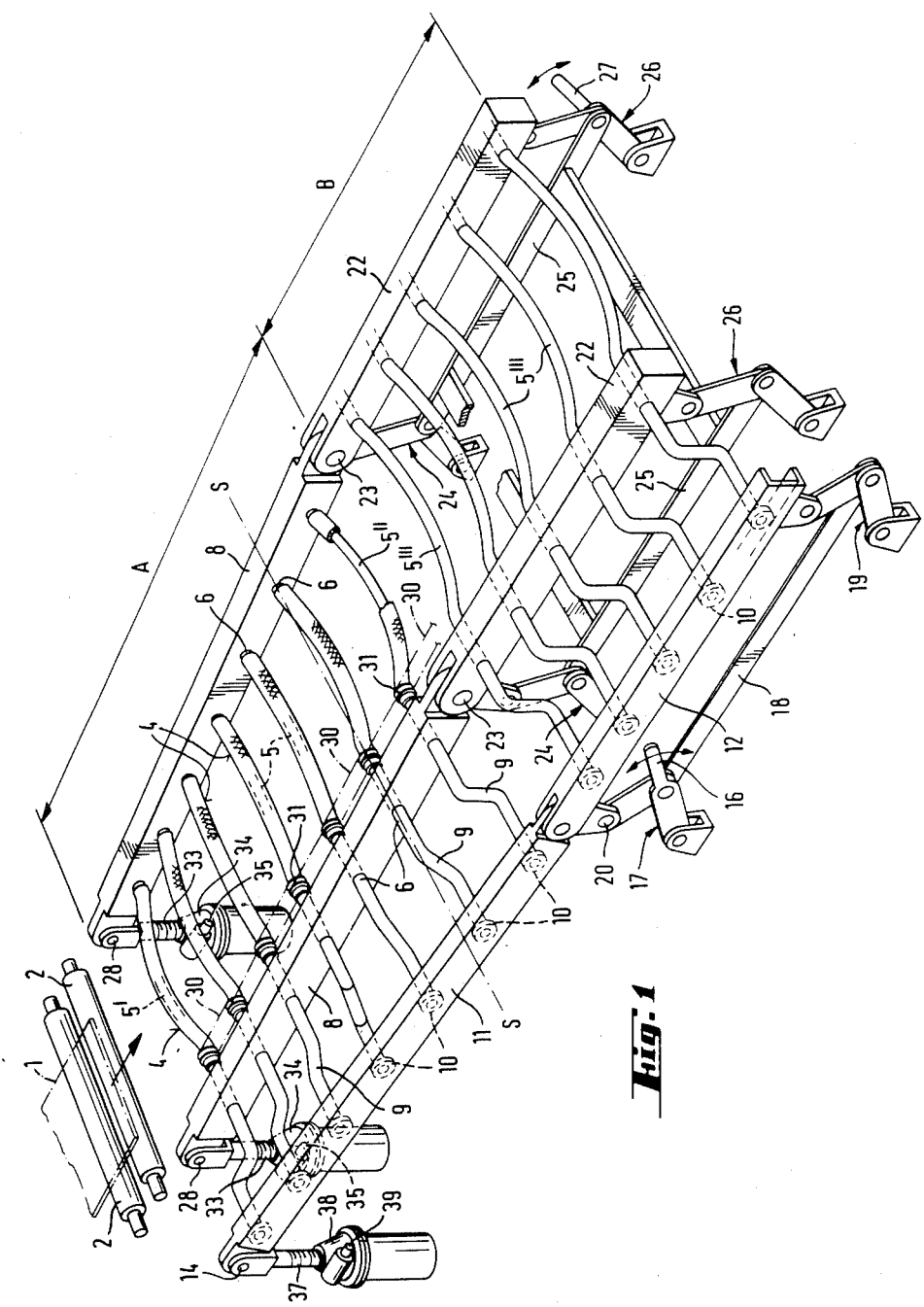
FIG. 1 is an overall view in perspective of an embodiment of a bending device according to the invention.

FIG. 1 illustrates the basic structure of a bending device according to the invention. Glass plates 1 to be bent are heated to the bending temperature in a heating furnace (not shown here), in which they are conveyed in the direction of arrow F by conveyer rollers 2 which are driven in rotation. The heating furnace is followed by a bending station. This bending station comprises a shaping bed confined in a heated enclosure (not shown) and consisting of a plurality of rotating shaping elements 3 on which glass plates 1 rest. Under the effect of their own weight, glass plates 1 take the shape of the shaping bed.

Each rotating shaping element 3 comprises a flexible woven metallic tubular sheath 4, resistant to twisting, and rotatably driven around a rigid curve rod 5.

All the curved rods have the same shape and the same radius of curvature. Each has a curved middle part and ends 6 which are straight in relation to this median part so that they are coaxial and form a pivoting axis S—S' around which the curved rod can be pivoted. These ends 6 of the curved rods are mounted to pivot in beams 8 parallel to the conveying direction of glass plates 1, these beams constituting a support frame for the shaping bed. On the outside of the frame determined by beams 8, each curved rod 5 is provided with a crank 9 which serves to pivot the rod in the desired angular position. For this purpose, a roller 10 is mounted on the end of each crank 9 and all rollers 10 associated with all curved rods 5 of the shaping bed are guided in a U-shaped rail, having a rail portion referenced as 11 in a first part A of the shaping bed, and a rail portion referenced as 12 in a second part B downstream from the first part A.

In the first part A of the shaping bed, curved rods 5 are all inclined differently, the inclination increasing progressively from one rod to the next, thus forming a shaping bed whose curvature in the crosswise direction perpendicular to the direction of advance of glass plates 1 steadily increases. In this embodiment, the shaping bed is concave.

Whereas the first curved rod 5 of the bending bed, i.e. referenced rod 5', is very slightly inclined, almost lying in the conveying plane, i.e., in the plane defined by the upper generatrices of rollers 2 of the heating furnace, following rods 5 are increasingly inclined, in the shaping direction, to the last rod 5 of portion A, this latter rod referenced 5", which has the maximum inclination determining the curvature desired for glass plates 1.

To assure the progressive increase of the inclination of the various curved rods 5, rail portion 11 is mounted to pivot around a transverse joint 14 located at its upstream end, which makes it possible to incline the rail portion in the direction of the progression of the glass plates in relation to the frame determined by beams 8, in particular in relation to the horizontal if this frame is placed horizontally. A lever 16 of a toggle joint mechanism 17, 18, and 19 described in detail below, serves to provide pivoting of rail portion 11 around joint 14.

Rail portion 12 in which end rollers 10 of cranks 9 of curved rods 5 travel in part B of the installation is hinged on a pin 20 belonging to the downstream end of rail portion 11. It can be varied in height while remaining in the same angular inclination, particularly while remaining horizontal, by action on lever 16 which controls the deformation of two contiguous parallelograms. The first parallelogram is formed by a connecting rod 18, two links 17 each fastened to two points distant from rail portion 12, this portion of rail portion 12 constituting the fourth side of the parallelogram. The second is formed by connecting rod 18 common to the two parallelograms, two arms 19, one of which is extended by lever 16, and a fourth side constituted by an unreferenced portion of a fixed frame located between two stationary points 21 for fastening of the two arms 19.

Because of the movement of rail portion 12 with a constant inclination, the pivoting of all the curved rods mounted in part B of the mounting installation and referenced 5''' is identical so that all these curved rods 5''' have the same inclination, an inclination that, moreover, is identical with that of curved rod 5'', the last of curved rods 5 of part A of the shaping bed.

Because of the connection between rail portion 12 and rail portion 11, the variation in height of rail portion 12 causes an inclination of rail portion 11 by pivoting around joint 14.

Instead of toggle joint mechanism 17, 18 and 19 it would, of course, be possible to use other means making possible a progressive adjustment in height of rail portion 12 and a progressive inclination of rail portion 11.

Curved rods 5''' of part B of the shaping bed are mounted to pivot in a frame 22 which is hinged around joints 23 on the downstream end of beams 8 of the frame of part A of the shaping bed. This frame 22 is mounted on a toggle joint mechanism 24, 25 and 26 of the same type as that which carries rail portion 12. this mechanism 24, 25 and 26 can be operated by a lever 27, which moves frame 22 up and down with no change in inclination, and which also modifies the inclination of the frame formed by beams 8 of first part A of the shaping bed by making beams 8 pivot around joints 28, located on a transverse horizontal axis XX' at the head of the installation.

Thus thanks to these adjustments it is possible in a simple way to modify the radius of curvature of the shaping bed.

Lever 16 and toggle joint mechanism 17, 18 and 19 make it possible not only to adjust the radius of curvature of the shaping bed, but also to orient the curvature, i.e., to make the bed concave or convex.

Lever 27 serves to adjust the height of portion B of the shaping bed and consequently the inclination of portion A of said bed, so that, for given widths of glass plates 1, either the line placed lengthwise to the center of said plates 1 or lengthwise the edges remains at a constant level.

Bearings 28 of beams 8 which constitute the frame carrying curved rods 5 in portion A of said shaping bed are adjustable in height. To do this, they are supported by rods 33 of lifting jacks 34. Rods 33 can be moved by action on drive shaft 35.

Analogously, joint 14 of U-shaped rail portion 11 is mounted on a rod 37 of a lifting jack 38, said rod being able to go up or down by action on drive shaft 39.

Flexible tubular sheaths 4, which are resistant to twisting and cover curved rods 5, are driven in rotation around rods 5 via sprockets 31 to which the sheaths are fixed. The sprockets engage in one or more drive chains 30.

Figure 2:
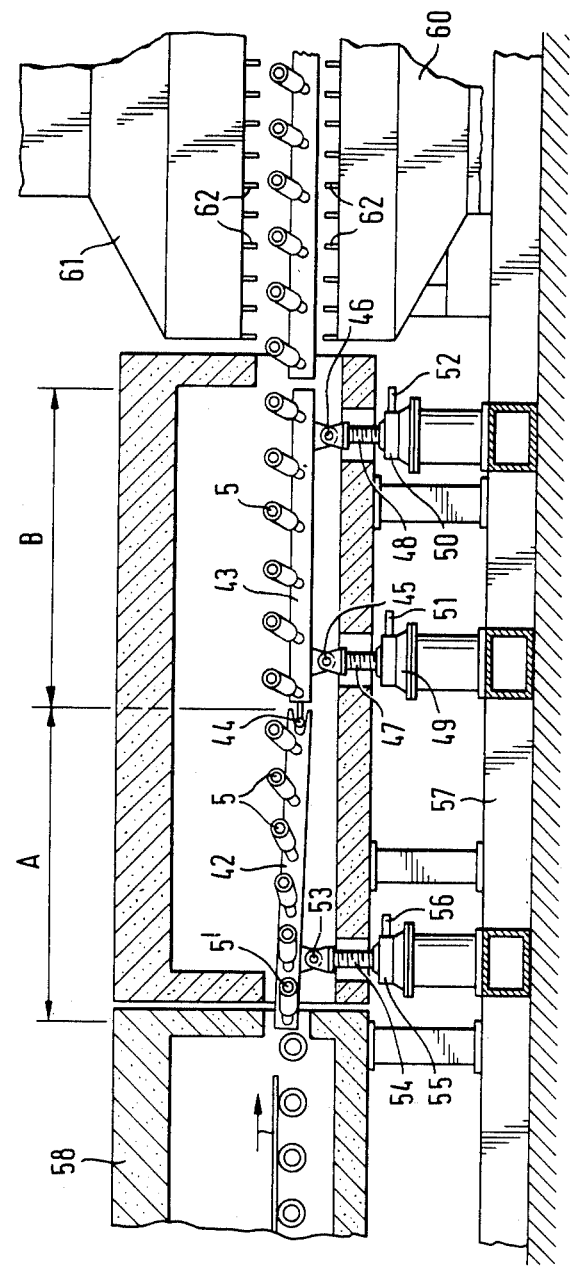
FIG. 2 is a view in longitudinal section of another embodiment of a bending device, according to the invention, preceded by a heating furnace and followed by a tempering station.

FIG. 2 shows, in longitudinal section along the median axis, a unit of an installation for making bent glass plates, including a second embodiment of a bending device according to the invention. This bending device is preceded by a heating furnace 58, equipped with rollers 2 for conveying the glass plates in the direction of arrow F, and followed by a tempering station 59. The elements of the bending station are shown in FIG. 1, i.e., mainly shaping elements 3 formed by curved rods 5 surrounded by flexible tubular sheaths 4 driven in rotation. These shaping elements 3 determine a shaping bed in two parts: a first part A in which the curvature presented to glass plates 1 is initially practically zero, and progressively increases until it becomes maximum at the level of the last element 5" of this part A, and a second part B in which the curvature is constant and equal to the curvature established by the last shaping element 5" of part A.

In first part A, curved rods 5 are mounted to pivot in beams 42 placed lengthwise and in second part B they are mounted in beams 43. Beams 43 are hinged on the downstream end of beams 42 by a joint 44, beams 43 of part B of the shaping bed rest on joints 45 and 46 mounted on rods 47 and 48 of lifting jacks 49 and 50 operated by shafts 51 and 52. Beams 42 of part A of the shaping bed are supported, on the one hand, by joint 44 and, on the other hand, at their upstream end on a joint 53 located on a transverse horizontal axis YY' and mounted on rod 54 of a lifting jack 55 operated by a shaft 56. Thus, it is possible to act on the position of all the rods, and even on the position of the first of rods 5 of the shaping bed, thanks to simple means for maneuvering with a great precision.

Jacks 49, 50 and 55 rest on fixed frame 57, as do the other parts of the installation, particularly heating furnace 58 and tempering station 59.

Tempering station 59 includes means for support of the bent glass sheets, i.e., curved rods 5 surrounded by flexible tubular sheaths, having the same orientation as rods 5 of part B of the shaping bed, and blowing boxes 60 and 61 delivering cooling air to the sheaths through tubular nozzles 62.

Figure 3:
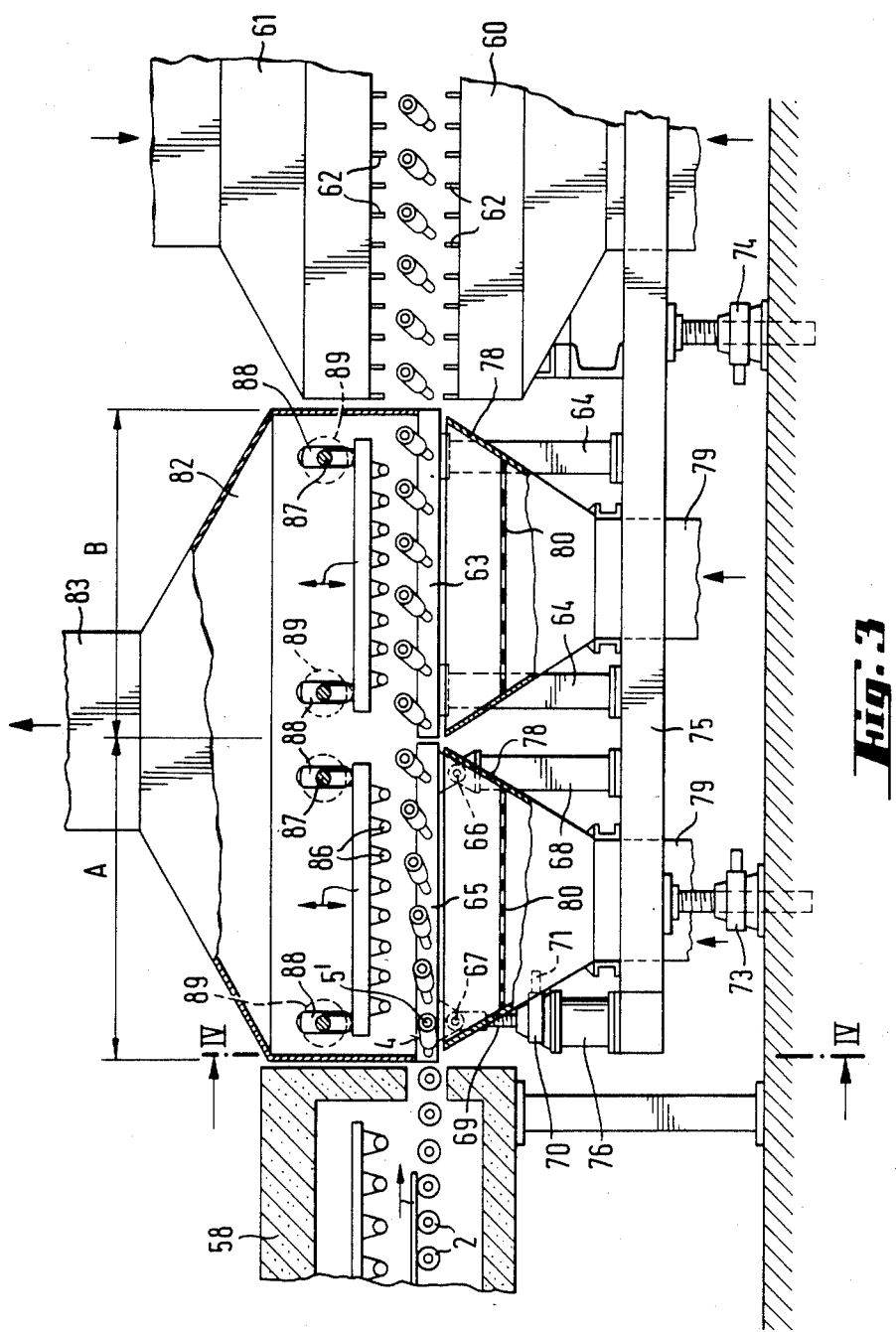
FIG. 3 is a view in longitudinal section of another embodiment of the bending device incorporated in an installation for making bent glass plates.
Figure 4:
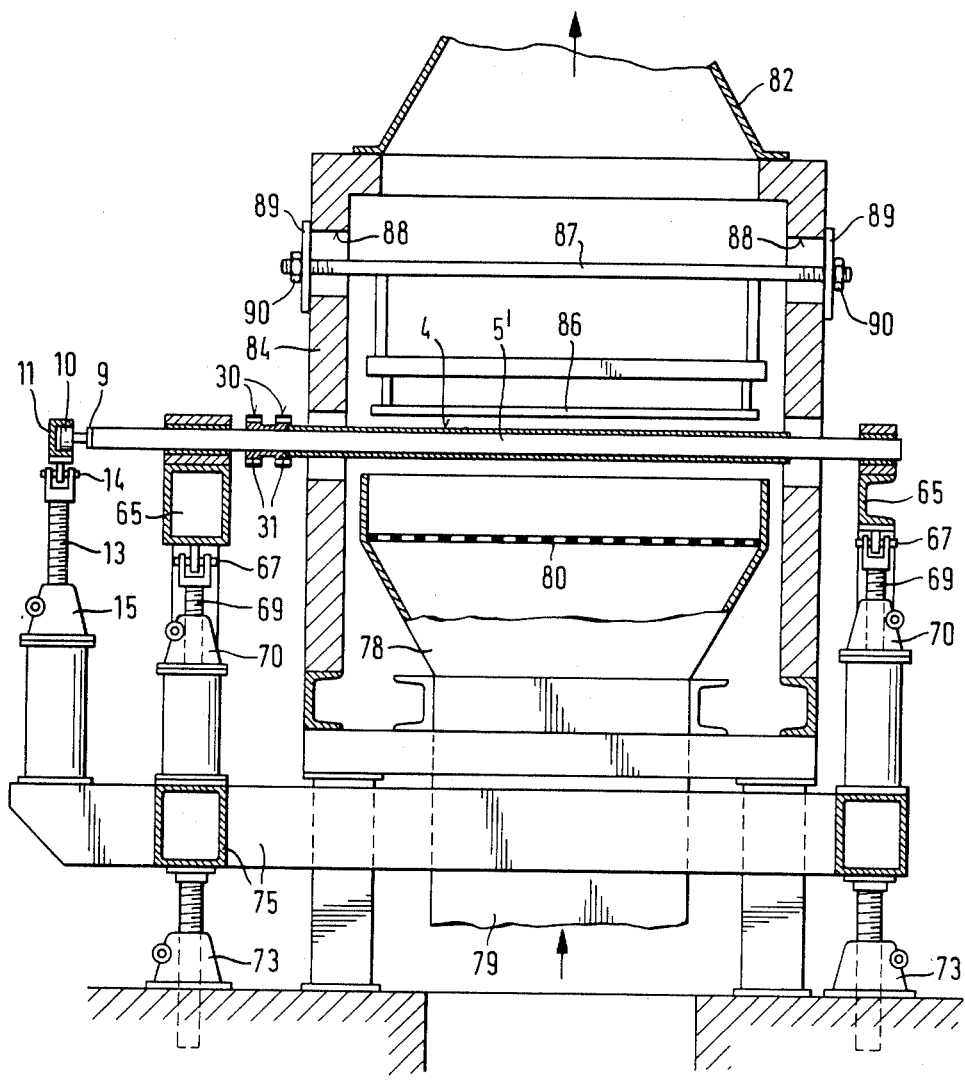
FIG. 4 is a view in vertical section along line IV—IV of FIG. 3.

Another advantageous embodiment of a bending device according to the invention is shown in FIGS. 3 and 4.

In this embodiment the beams which support the curved rods of second part B of the shaping bed are referenced 63 and form a frame that rests on pillars 64. The beams that support the curved rods of first part A of the shaping bed are referenced 65 and are mounted on joints 66, 67. Joints 67 are located on a transverse horizontal axis ZZ'.

Each front or upstream joint 67 is carried by a rod 69 of a lifting jack 70 operated by a shaft 71, while each back or downstream joint 66 is carried by a pillar 68.

The assembly of pillars 64 and 68 and of jack 70 rests on a frame 75 which is carried by jacks 73 and 74.

Overall adjustment in height of the shaping bed is performed first with lifting jacks 73 and 74. In this adjustment, account is taken of the radius of curvature to be given to the glass plates, of the width of said plates with a view to orienting the shaping bed, particularly horizontally. The jacks bring frame 75, on which pillars 64, 68 and jack 70 carrying the shaping bed rest, to the desired height.

Then, a more precise adjustment by jack 70 makes it possible to correct the height of the beginning of the shaping bed.

Of course, the cranks fitted on the curved rods, the rollers, and the support rails necessary for orientation of the curved rods still exist in this embodiment, but they are not shown to avoids cluttering the drawing.

Advantageously, below parts A and B of the shaping bed are provided funnel-shaped enclosures 78, closed at their upper end by perforated plates 80, fed by feed pipes 79 with pressurized gas, generally air, heated to about 650° C. The hot air, emitted vertically from the bottom to the top through the perforations in plates 80, is directed toward the lower face of the glass plates and thus forms a homogeneous, uniform flow of gas providing support to said glass plates. When the excess pressure in enclosures 78 is about 10 to 60 mm water gage (10–60 mm WG) or 100 to 600 Pa, when the perforations through plates 80 have a diameter of 12 to 15 mm and are evenly distributed in both the crosswise and lengthwise directions with the same pitch of 25 to 35 mm, and when the distance between perforated plates 80 and the glass plates is such that at the level of the glass the static pressure is negligible in comparison with the dynamic pressure, which corresponds to distances between plates 80 and glass plates on the order of 100 to 300 mm, there is obtained on the glass plates a homogeneous, uniform pressure on the order of 2 to 30 mm WG, which makes it possible to take over 20 to 80% of the weight of the glass plates, thus reducing the pressure exerted by the shaping elements on the plates and notably improving the optical quality.

Above the shaping bed is mounted a hot gas aspiration hood 82. This hood 82 is connected to an evacuation pipe 83 with a conduit (not shown) which recycles the recovered gas.

This gas receives additional heat and is reinjected into enclosures 78 by feed pipes 79.

Just above the shaping bed, and lower than the input of hood 82, are provided heating elements 86 fastened to a support 87 that is adjustably secured by holding lugs 88.

Upstream from the bending station itself is heating furnace 58 in which the glass plates, conveyed flat on cylindrical conveyer rollers 2, are heated to bending temperature.

Tempering station 59 with blowing boxes 60 and 61 deivering tempering gas by tubular nozzles 62 is placed downstream from the bending station.

FIG. 4 shows other details relating to the design and mounting of the bending station shown in FIG. 3. Thus, there can be seen crank 9 provided at the end of first curved rod 5' provided with roller 10 which is guided in U-shaped rail portion 11. As can be seen in this FIG. 4, the curved middle part of this rod 5', its ends, and crank 9, are in the same horizontal plane. It can also be seen, as shown in perspective in FIG. 1, that U-shaped rail portion 11 is mounted to pivot on joint 14 fastened to rod 37 of jack 38. Tubular sheath 4 rotates around curved rod 5', this sheath 4 being fixed to a sprocket 31 which engages with a chain 30, this sprocket 31 being placed on the outside of enclosure 84 which encloses the bending station. Like jack 70 placed under the upstream end of part A of the shaping bed, jack 38 rests on frame 75 which, for its part, can be adjusted in height by lifting jacks 73.

Heating elements 86, already mentioned in connection with FIG. 3, are shown in FIG. 4. These heating elements are carried by supports 87, secured by lugs 88 which are fastened by washers 89 and nuts 90 in the side walls of enclosure 84.

FIGS. 5 and 6 illustrate the steps performed in using the device of the invention. FIG. 5 shows a glass plate 1 of width $b_1$ to be bent with a radius of curvature R. FIG. 6 shows a glass plate 1' of width $b_2$ less than $b_1$ which also is to be bent with a radius of curvature R.

In the heating furnace, conveying plane E is determined by the upper generatrices of cylindrical conveyer rollers 2. For passage into the bending station on the first shaping element comprising curved rod 5' of the first part A, slightly inclined in such a direction that the bending bed is concave, the bearings of said rod 5' are lifted a height h1 so that the lengthwise edges 92 of glass plate 1, which is located in the curved portion of curved rod 5' which is slightly lowered in relation to its ends because of the inclination and curvature of said rod, remain at the level of conveying plane E. On the other hand, the central zone of the glass plate which fits the curved median part of rod 5, sags below the level of edges 92.

The bearings of the following curved rods 5 are increasingly lifted to keep edges 92 always at the same level while the center increasingly sags. Thus last rod 5" of rods 5 of portion A of the shaping bed has its bearings offset upward a height $h_2$ above conveying plane E, substantially greater than $h_1$.

If now, as FIG. 6 shows, a glass plate 1' of width $b_2$ less than $b_1$ is curved, the bearings of curved rod 5', inclined to exhibit upward concavity, should be lifted a distance $H_1$ greater than $h_1$ so that edges 93 of plate 1' remain at the level of initial conveying plane E. Analogously, distance $H_2$ of the upward offset of the bearings of curved rod 5" at the downstream end of part A of the shaping bed, is clearly greater than $H_1$ and $h_2$.

The figures show in particular that adjustment of the height, according to the invention, of the pivoting axis of part A of the shaping bed plays an essential role, even for the first shaping elements.

Thanks to the proposed device, the transverse pivoting axis of the frame supporting the shaping bed can be adjusted in height, and said frame can be inclined by pivoting around this transverse axis making it possible progressively to increase or decrease the height of the bearings of the curved rods, in the direction of the curvature of the shaping bed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for bending a heat softened glass plate moving in a substantially horizontal orientation, comprising:
    a horizontal frame having an upstream end pivotable about a horizontal transverse axis;
    a plurality of rotating shaping elements rotatable about axes movable with said frame, said plurality of elements being spaced in a longitudinal direction, said shaping elements defining curved generatrices in contact with said glass plate, said curved generatrices having increased degrees of curvature with increased distance from said upstream end, said frame and shaping elements together defining a shaping bed;
    first means for simultaneously adjusting said degrees of curvature of all of said curved generatrices; and
    second means independent of said first means for adjusting the height of said horizontal frame such that a selected transverse portion of a sheet being bent by the weight thereof during movement along said shaping bed can be maintained at a constant height while moving in said longitudinal direction along said shaping bed.

2. The device of claim 1, wherein said frame comprises a first upstream frame portion and a second downstream frame portion, wherein said means for adjusting the height of said frame includes means for adjusting the height of said second frame portion while maintaining constant the inclination of said second frame portion.

3. The device of claim 1, wherein said entire shaping bed and said second means for adjusting are mounted on a common frame, further comprising third means for adjusting the height of said common frame.

4. The device of claim 1, including enclosure means below said shaping bed for providing to said shaping bed an upward uniform flow of pressurized gas at a dynamic pressure sufficient to support a substantial portion of the weight of glass sheets on said shaping bed.

5. The device of claim 4, wherein an upper part of said enclosure means is covered by a perforated plate having evenly distributed perforations, said plate being placed at a distance of 10 to 30 cm below the glass plates on said shaping bed.

6. The device of claim 5, wherein the pressure of said pressurized gas in said enclosure means is 10 to 60 mm water gage, and wherein said perforations provided in the perforated plate have a diameter of 12 to 15 mm and are distributed with the same pitch of between 25 and 35 mm in two orthogonal directions.

7. The device of claim 4, including a hood mounted above said shaping bed for evacuation of said pressurized gas, said hood being connected to means for recovering said gas and recycling said gas.

8. The device of claim 2, wherein said entire shaping bed and said first means for adjusting are mounted on a common frame, further comprising second means for adjusting the height of said common frame.

9. The device of claim 2, including enclosure means below said shaping bed for providing to said shaping bed an upward uniform flow of pressurized gas at a dynamic pressure sufficient to support a substantial portion of the weight of glass sheets on said shaping bed.

10. The device of claim 3, including enclosure means below said shaping bed for providing to said shaping bed an upward uniform flow of pressurized gas at a dynamic pressure sufficient to support a substantial portion of the weight of glass sheets on said shaping bed.

11. The device of claim 9, wherein an upper part of said enclosure means is covered by a perforated plate having evenly distributed perforations, said plate being placed at a distance of 10 to 30 cm below the glass plates on said shaping bed.

12. the device of claim 11, wherein the pressure of said pressurized gas in said enclosure means is 10 to 60 mm water gage, and wherein said perforations provided in the perforated plate have a diameter of 12 to 15 mm and are distributed with the same pitch of between 25 and 35 mm in two orthogonal directions.

13. The device of claim 10, wherein an upper part of said enclosure means is covered by a perforated plate having evenly distributed perforations, said plate being placed at a distance of 10 to 30 cm below the glass plates on said shaping bed.

14. The device of claim 13, wherein the pressure of said pressurized gas in said enclosure means is 10 to 60 mm water gage, and wherein said perforations provided in the perforated plate have a diameter of 12 to 15 mm and are distributed with the same pitch of between 25 and 35 mm in two orthogonal directions.

15. The device of claim 9, including a hood mounted above said shaping bed for evacuation of said pressurized gas, said hood being connected to means for recovering said gas and recycling said gas.

16. The device of claim 10, including a hood mounted above said shaping bed for evacuation of said pressurized gas, said hood being connected to means for recovering said gas and recycling said gas.

* * * * *